United States Patent [19]
Gagliardi, Jr. et al.

[11] 4,229,859
[45] Oct. 28, 1980

[54] MEAT PATTY PROCESSING METHOD AND APPARATUS

[75] Inventors: Eugene D. Gagliardi, Jr., West Chester; Nicholas C. Gagliardi, Newtown Square, both of Pa.

[73] Assignee: Gagliardi Bros., Inc., West Chester, Pa.

[21] Appl. No.: 901,558

[22] Filed: May 1, 1978

Related U.S. Application Data

[63] Continuation-in-part of Ser. No. 744,587, Nov. 24, 1976, abandoned.

[51] Int. Cl.³ .............................................. A22C 7/00
[52] U.S. Cl. .......................................... 17/45; 17/32; 100/222
[58] Field of Search ................... 17/32; 100/222, 237, 100/238, Dig. 10

[56] References Cited

U.S. PATENT DOCUMENTS

| | | | |
|---|---|---|---|
| 2,509,971 | 5/1950 | Elsaesser | 17/32 |
| 2,528,125 | 10/1950 | Elsaesser | 17/32 |
| 2,545,451 | 3/1951 | Elsaesser | 17/32 |
| 2,657,423 | 11/1953 | Elsaesser | 17/32 |
| 3,245,106 | 4/1966 | Alderdice | 17/32 |
| 3,397,655 | 8/1968 | Valadez et al. | 99/349 |
| 3,535,735 | 10/1970 | Egee | 17/32 |
| 3,648,600 | 3/1972 | Jaccard | 17/32 X |
| 3,728,136 | 4/1973 | Langlands | 100/222 X |
| 3,999,248 | 12/1976 | Mauer et al. | 17/32 |
| 4,033,253 | 7/1977 | Stollenwerk et al. | 100/222 X |

*Primary Examiner*—Willie G. Abercrombie
*Attorney, Agent, or Firm*—Seidel, Gonda, Goldhammer & Panitch

[57] ABSTRACT

A process and apparatus are provided for making substantially disk-shaped meat patties having substantially uniform weight from substantially cylindrical masses of ground meat. The cylindrical masses of ground meat are placed upon a conveyor and while the conveyor is continuously advancing, they are flattened by at least one flattening means, such as a piston press, to form patties which look like, taste like and have the texture of homemade patties.

13 Claims, 4 Drawing Figures

MEAT PATTY PROCESSING METHOD AND APPARATUS

CROSS-REFERENCE TO RELATED APPLICATION

This is a continuation-in-part of our abandoned application Ser. No. 744,587 filed Nov. 24, 1976 entitled "Process AND Apparatus For Making Meat Patties".

BACKGROUND OF THE INVENTION

This invention pertains to a process and apparatus used in continuously and automatically manufacturing meat patties from cylindrical masses of ground meat. The invention is most practically applied in the food processing industry, but may also be used in restaurants, institutions and the like, and even on a smaller scale in the home.

Prior art devices for making meat patties generally have been of the type in which ground meat is placed within a housing (mold), the walls of which urge the meat into the center of the housing. A first plate having a hole cut through it corresponding to the diameter of the patty which is to be made reciprocates through horizontal slots in two opposite side walls. When the plate is within the housing, the ground meat fills the hole in the plate. The plate is then withdrawn from the housing and excess meat is scraped from the top and bottom of the patty by the edges of the slots in the walls. A plunger outside of the housing, having approximately the same diameter as the hole in the plate, forces the meat patty out of the hole. The patty is then stippled with a roller to give it the desired texture.

There are often problems with this system in that the meat is compacted into the hole and is hard to remove from the hole or that the meat sticks to the surfaces of the housing walls and must be scraped therefrom. The patties are very densely packed. This imparts excessive toughness to and removes juices from the patties made by the conventional process and equipment. Additionally, this system is based on the volume of the meat which can be accommodated within the hole in the plate, rather than on the weight of the meat. Thus, because of the different densities of meat, the weight of each patty may differ from the others.

While various devices have been used to alleviate these problems, the resulting patties are characteristic of machine-produced patties. Generally, they look like very flat disks aptly referred to as like "hockey pucks" having sharp edges between the top and bottom walls and the very regular side walls. Furthermore, the taste of these machine-produced patties leaves much to be desired. During the pressing process, these patties are frequently compressed to the extent that the juices are exuded and much of the flavor is lost from the meat patties. Frequently, the patties are pressed to such an extent that any voids which exist in the ground meat and give the meat its texture are eliminated. This produces a very compact piece of meat which often is so tough that it approaches rubber-like consistency.

Moreover, prior art patty-making apparatus, such as those commercially available from Hollymatic, Formax and FMC, were generally only suitable for making beef patties. Thus, some meat or food products having a gluey or sticky consistency could not be done automatically due to severe sticking to the molds or machine surfaces. The prior art devices generally form patties from masses of meat based on volume, not weight.

Several patents have been directed to finding a solution to these problems. Among them are the following:

U.S. Pat. No. 2,509,971 issued to Elsaesser discloses a hamburg steak patty forming machine wherein an ice cream scoop of ground meat is manually placed on a sheet of paper moving on a conveyor belt. The sheet of paper is folded over the top of the meat and is conveyed under an angled pressing conveyor disposed above the conveyor on which the meat was first placed. Again, the measure of meat is volume, rather than weight. The process and apparatus is adapted for compressing only one row of ground meat into patties after the ground meat has been manually placed on the first conveyor.

U.S. Pat. No. 2,545,451 issued to Elsaesser discloses a meat patty forming machine wherein meat extruded from a grinder is cut off into suitable lengths and falls between two rolls of paper, one on either side of the extruded mass of meat. The mass is compressed between the two rolls of paper at the same time that it is wrapped. The wrapped patty must be compressed further by passing through adjacent feed rollers before the continuous link of wrapping is cut to define individually wrapped patties. This devices provides meat on the basis of volume, as determined by the length of the extrusion, rather than weight. Additionally, only one mass of meat goes through the paper roll presser means at once.

U.S. Pat. No. 2,657,423 issued to Elsaesser discloses a machine for making steak patties wherein a continuous mass of meat is extruded from a grinder between layers of moving paper. The meat and the paper are conveyed under a dividing and mashing unit comprising a drum having radially disposed divider blades projecting out from the surface of the drum. After passing under the dividing and mashing unit, the continuous mass of extruded meat is formed into a plurality of wrapped bars of ground meat. The bars are conveyed to an area where a knife severs the wrapped bars from each other. This machine provides an extruded continuous mass of meat based on volume, rather than discrete substantially cylindrical masses of meat in a plurality of rows on a conveyor belt. This machine, like the others described in the above-mentioned Elsaesser patents, forms patties which are wrapped in paper. The requirement of the use of paper adds to the complexity of the machines as well as to their cost and to the cost of the process of forming the patties.

There has been a long felt and unsolved need in the food industry to produce a meat patty which has the appearance, consistency or texture and taste of home-made meat patties. Because of the great time and labor involved in making meat patties manually, the food industry has generally sacrificed quality for the efficiency and speed offered by an automated process.

By employing the present invention, the food industry could retain the present efficiency and speed but produce meat patties having much greater public appeal. The patties produced by the present invention may be produced in restaurants or produced by manufacturers for packaging and sale for restaurant, institutional and home use. This would be beneficial to the economy in general, and to the so-called fast food type restaurants in particular.

Our prior abandoned application Ser. No. 744,587 describes a process and apparatus in which substantially spherical masses of meat are formed into meat patties by flattening between a rotating drum and the conveyor belt. The present invention seeks to improve that method and apparatus by providing better operating speed and better control of patty size and shape.

SUMMARY OF THE INVENTION

In order to overcome the aforementioned disadvantages of prior art patty-making systems, the present invention provides a method and apparatus for efficiently and automatically producing meat patties having the taste, texture and appearance of homemade meat patties. The patties are formed from masses of meat each having substantially the same weight.

By the process of the present invention, a plurality of substantially cylindrical masses of ground meat are formed, aligned in rows on a conveyor surface and then flattened between two moving surfaces to form substantially disk-shaped meat patties having a thickness less than or equal to approximately one-half of the length of the substantially cylindrical masses of ground meat.

The term "substantially cylindrical" includes such shapes as slightly squared cylinders, slightly rounded cylinders, etc.

The preferred apparatus for carrying out the method according to the present invention comprises a machine for forming substantially cylindrical masses of ground meat of uniform weight, a meat distribution conveyor which includes an alignment device, a driven endless conveyor belt onto which the cylindrical masses of ground meat are placed and a driven flattening means disposed above the conveyor to flatten the substantially cylindrical masses to form the disk-shaped patties.

The flattening means is at least one piston press disposed above the conveyor belt and in spaced relation thereto. When the substantially cylindrical mass of meat passes between the press and the conveyor, the press is driven downward by a piston and the mass is flattened into a substantially disk-shaped meat patty. The meat patty thus produced is then conveyed by a second conveyor for further processing or packaging.

If desired, a series of flattening presses may be used to flatten the masses into patties by incremental flattening. By incrementing the flattening of the masses, the speed of the conveyor can be increased, and the flattening process may be controlled more precisely. If the flattening is done too fast, the patties may crack and break apart during their formation.

All of the surfaces which contact the meat may be coated with a non-stick coating of a polymeric material. Both the speed of each moving surface and the length of the piston stroke are adjustable to provide patties having different sizes and degrees of flattening. By using the present process and apparatus, the resulting meat patty very closely resembles that made by the manual, homemade process.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE PREFERRED EMBODIMENT

Figure 1:
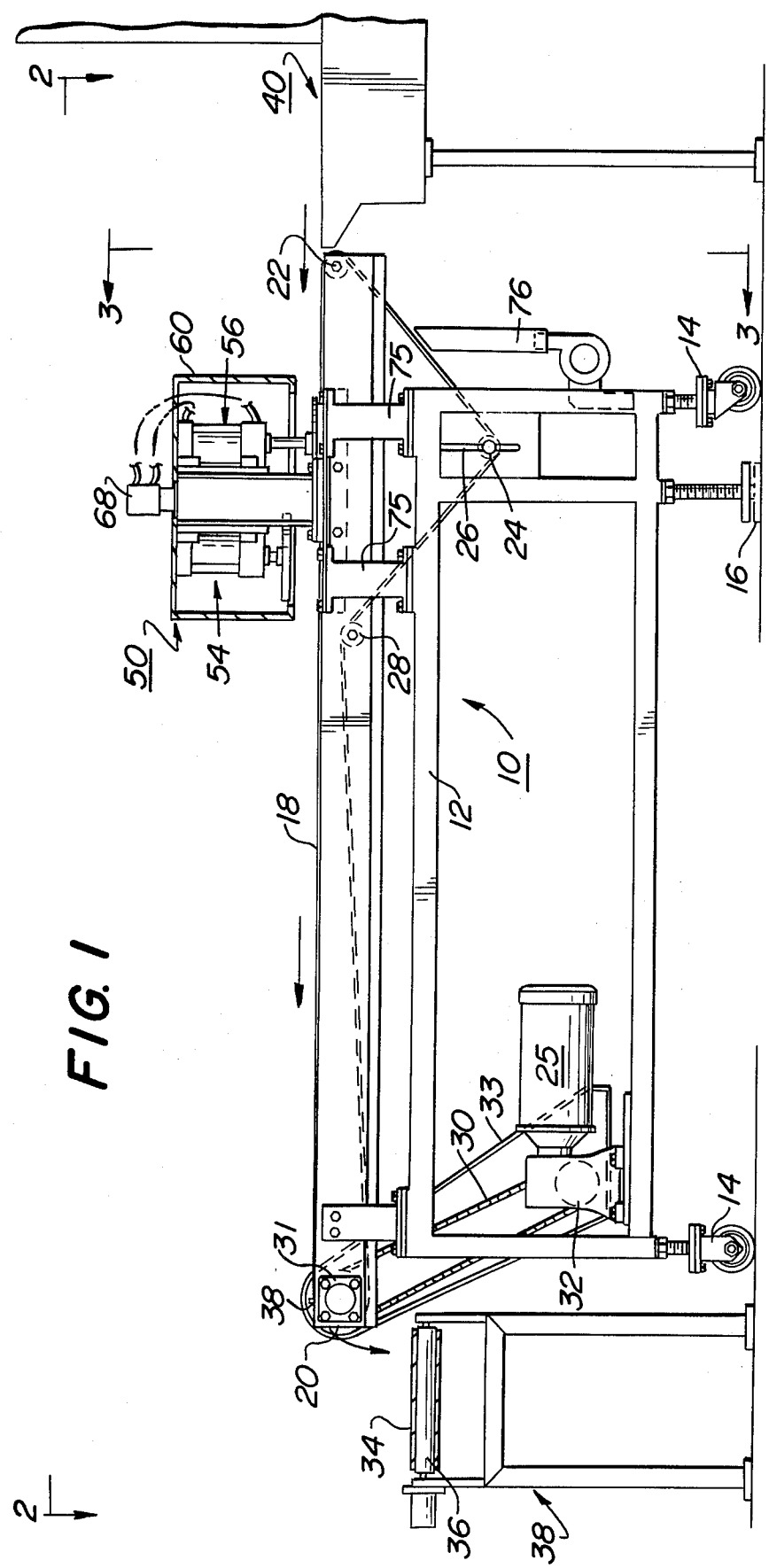
FIG. 1 is a side elevation view of an apparatus according to the present invention, partly broken away for purposes of illustration.

Referring to the drawings in detail, wherein like numerals indicate like elements, there is shown in FIG. 1 the apparatus of the present invention designated generally as 10. Apparatus 10 comprises frame member 12 supported by caster legs 14. An auxiliary leg 16 may be attached to frame 12 for added support and stability.

A conveyor means is attached to frame member 12. In the presently preferred embodiment, the conveyor means is represented by endless conveyor belt 18, which is mounted around driving roller 20 at the exit end of the conveyor and free roller 22 at the entrance end of the conveyor. The rollers are mounted on the frame member 12 by any suitable means. Adjustable roller 24 is provided to obtain proper tensioning of the belt 18. Each end of roller 24 is slideable in a slot 26. After obtaining the desired tension on belt 18 by sliding the end of roller 24 in slot 26, suitable tightening means are used to lock the roller in the desired position. Idler roller 28 is used to support belt 18.

Driving roller 20 is driven by driving means 25, for example, an electric motor, which may be mounted on frame 12. A chain 30 interengages with sprockets or pulleys 31 and 32 (best shown in FIG. 3) respectively located on the shafts of driving roller 20 and driving means 25. Guards 33 encloses chain 30.

Any machine which is capable of forming substantially cylindrical masses of ground meat may be used in this invention. A particularly suitable commercially available device is the VEMAG 3000S continuous vacuum stuffer, distributed by Robert Reiser & Co., Inc., which has a meatball forming attachment connected to it. This machine may take ground meat and form substantially cylindrical masses of meat having uniform weight as desired. In general, 2 to 8 ounce meat cylinders can be used. Thus, if the machine is adjusted to produce 3 ounce meat cylinders, each cylinder will be about 1½ inches high and 2 inches in diameter. It is the general practice in forming patties to use meat at a temperature of approximately 30° F. Although this temperature is not critical, the meat will stick, smear and drag if it is too warm (about 40° F. or above) and the meat will crack and break up or fail to form properly if it is too cold (about 26° F. or below). Additionally, the process may be carried out at usual meat processing room temperature in the range of 45° F. to 55° F., normally 50° F.

Meat distributing means 40 distributes the cylinders made by the meatball forming machine (not shown) on belt 18 in at least two rows Although spherical masses of meat could be used in this invention, the use of meat cylinders is preferred because the cylinders will have less tendency to roll. The presently preferred meat distributor is a line divider conveyor, best shown in FIG. 2, which is well known in the art and commercially available.

Meat cylinders 42 are discharged from a meatball forming machine onto a plate 44 on the line divider conveyor. Every second plate 44 is attached to band 46. Similarly, alternating plates are attached to band 48. After cylinders 42 are placed on plates 44, the plates diverge from the loading station at the midpoint of the conveyor to form two (or more) rows of cylinders. The meat is then fed from the line divider conveyor 40 to conveyor belt 18. Thus, two rows of meat cylinders are formed on conveyor belt 18. The meat cylinders 42 are fed alternatingly to each row. Of course, only one row or more than two rows of meat can be placed on conveyor 18, and any suitable distributing means may be used.

After meat cylinders 42 are placed upon endless belt 18, they are flattened by flattening unit 50 to produce meat patties 52, which are then deposited on conveyor 34 for further processing, freezing or packaging. Conveyor 34 is mounted upon rollers 36, only one of which is shown, which are mounted upon support structure 38. The longitudinal axis and direction of travel of conveyor 34 are optionally perpendicular to those of conveyor 18.

Figures 3, 4:
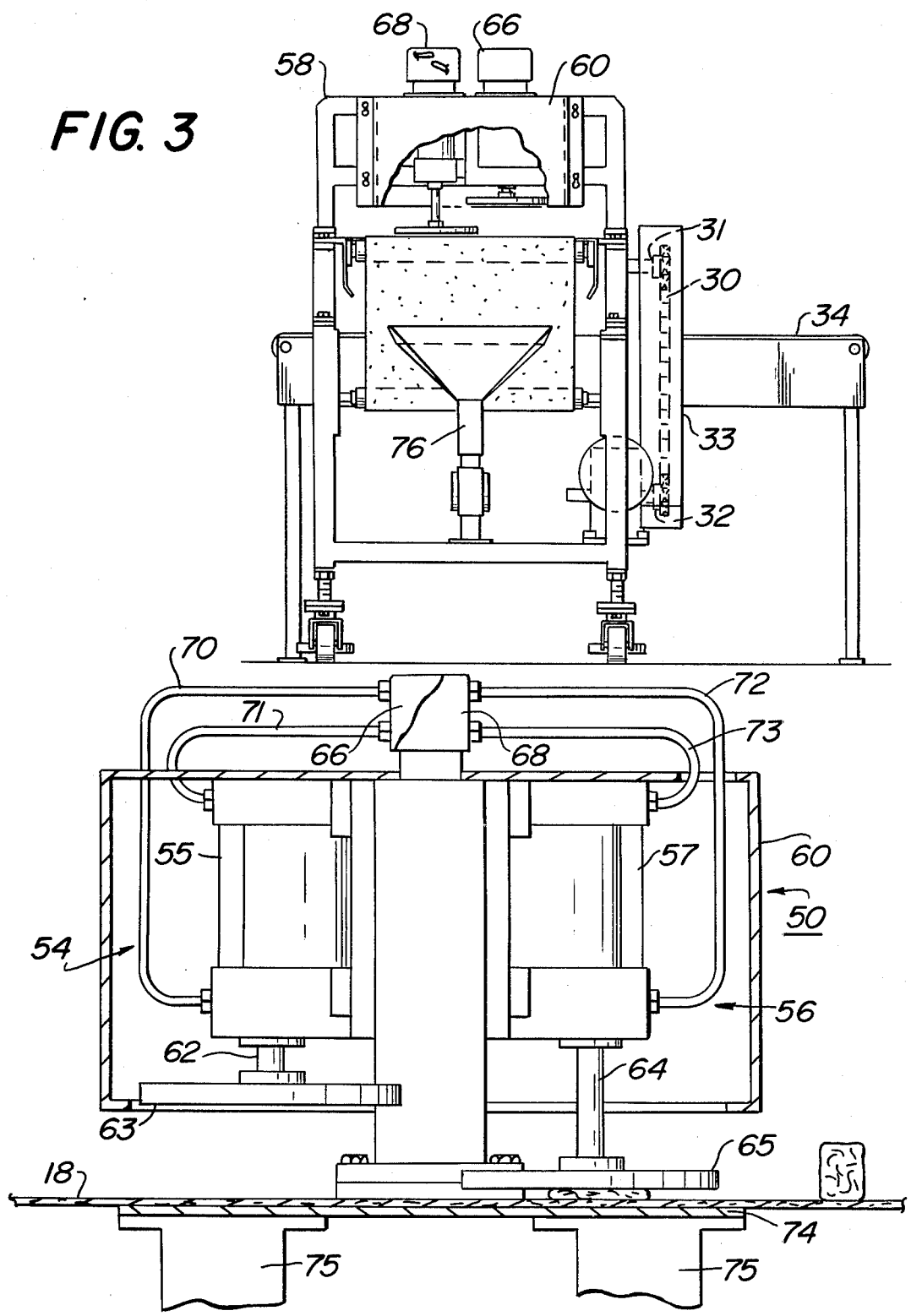
FIG. 3 is an end elevation view (partly broken away) taken along line 3—3 in FIG. 1.
FIG. 4 is an enlarged cross-sectional view of the piston presses of the apparatus taken along line 4—4 in FIG. 2.

Flattening unit 50 includes two (or more) pneumatically operated piston presses 54 and 56. Support 58 suspends the presses 54 and 56 above the conveyor belt 18. A guard 60 is provided to partially enclose the presses 54 and 56. As best seen in FIG. 4, the presses 54 and 56 include pneumatic cylinders 55 and 57, pistons 62 and 64, and press plates 63 and 65.

The cylinders 55 and 57 are controlled by valves 66 and 68 respectively. Valve 66 controls the flow of fluid to cylinder 55 through fluid supply lines 70 and 71, while valve 68 controls the flow of fluid in supply lines 72 and 73. For example, valve 68 will alternate the flow of fluid into lines 72 and 73 to raise and lower piston 64 in a manner well known in the prior art. Thus, the two piston presses 54 and 56 are reciprocated in a direction substantially perpendicular to belt 18. Suitable timing and/or sensing devices (not shown) may be provided on the flattening unit to coordinate the piston strokes with the presence of a meat cylidner under the press plate. Such devices are conventional and well known and need not be described here since they are not part of the invention.

In order to vary the thickness of the meat patties made, the length of the stroke of the pistons 62 and 64 may be adjusted by varying the amount of fluid delivered to cylinders 55 and 57 during any one stroke.

A platen 74 is placed under belt 18 in the area in which press plates 63 and 65 form the patties. The platen 74 prevents belt 18 from becoming stretched or worn. Platen 74 is connected to platen supports 75 which in turn are connected to frame 12.

The meat flattening surfaces of the plates 63 and 65 may be coated with a non-stick polymeric material, such as, for example, a sheet or film of polytetrafluoroethylene, fluorinated ethylenepropylene copolymer, or the like. One suitable coating is a 0.005 inch thick coating of glass impregnated polytetrafluoroethylene which is sold by DuPont under the trademark ARNOLAN. Conveyor belt 18 may be made of neoprene and likewise coated with an anti-stick polymeric material.

The meat flattening surfaces of press plates 63 and 65 are preferably heated to approximately 200° F. to improve their non-stick quality. The temperature here is not critical, and generally temperatures from about 175° F. to 300° F. are acceptable. Similarly, an optional hot air blower 76 may be provided to heat belt 18 and improve its non-stick characteristics.

The process of the invention and the operation of the patty forming apparatus will now be described. Frozen meat is ground and placed into the meatball forming machine. The VEMAG 3000S is capable of producing cylindrical masses of meat having exact weights as desired. This is a distinct advantage over present patty forming machines which form patties according to the volume of ground meat which can be placed into the hole in a reciprocating flat plate, and weights may vary. Thus, in the prior art, the basic measurement is volume. In the present invention, the basis of measurement may be exact weight.

The present process and apparatus are adaptable to virtually any meat product, and are not limited to beef patties as was sometimes the case with prior art apparatus. Such meats include, for example, beef, pork, lamb, sausage, chicken, turkey and other poultry, and fish. Various flavoring additives may be added as desired. An example of a flavored meat product would be pizza burgers.

The substantially cylindrical masses of ground meat 42 are distributed by distributing means 40 in two rows across conveyor 18. The operation of distributing means 40 is described above. To efficiently practice this invention, at least two rows are necessary. If only one is used, the increase in piston speed tends to cause the meat cylinders to break apart when pressed. Even when more than two rows of the substantially cylindrical masses of ground meat are deposited on the conveyor, in most cases, higher quality meat patties can be readily produced in a more economical and efficient manner than by using the presently available methods and apparatus.

Masses 42 are then conveyed through flattening unit 50 where presses 54 and 56 alternately flatten masses 42 to substantially disk-shaped patties 52. Since the stroke of the pistons 62 and 64 may be adjusted, the cylindrical masses may be flattened to any desired thickness. In order to maintain proper appearance and taste similar to that of homemade patties, the length of the stroke of the piston is adjusted so that the resulting patties 52 having a thickness corresponding to approximately $\frac{1}{8}$ to $\frac{1}{2}$ and preferably, about 1/6 to about $\frac{7}{8}$ of the diameter of the substantially cylindrical masses of ground meat 42. The process of flattening the cylindrical masses is an alternating one, in that presses 54 and 56 alternate in flattening the masses. This is the reason for the staggering of the masses in two rows on belt 18.

The size and shape of the resulting meat patty is controlled by the pressure of the flattening plate (i.e., the length of the piston stroke), the speed of the piston stroke, the speed of the conveyor belt or a combination of these. For example, if a 2½ inch piston stroke is used, the time to complete the downstroke could be adjusted to vary from about $\frac{1}{4}$ second to 1 second. The slower speed would be used for larger patties. The speed of the continuously moving conveyor 18 is also adjustable. Since the dwell time of the piston at the bottom of its stroke is approximately 1/10 second (i.e., the split second reversal of the piston), there is a small amount of sliding between the patty and the conveyor.

The conveyor speed can be adjusted to obtain maximum efficiency while still maintaining the look of the homemade patty. Thus, a wide operating speed range is available with this invention. This wide operating range makes this apparatus readily compatible with processing equipment used downline of the patty forming. For example, for the 3 ounce size of meat patty, a conveyor speed in the range of about 29 to 102 feet per minute, and typically 68 feet per minute is satisfactory.

Figure 2:
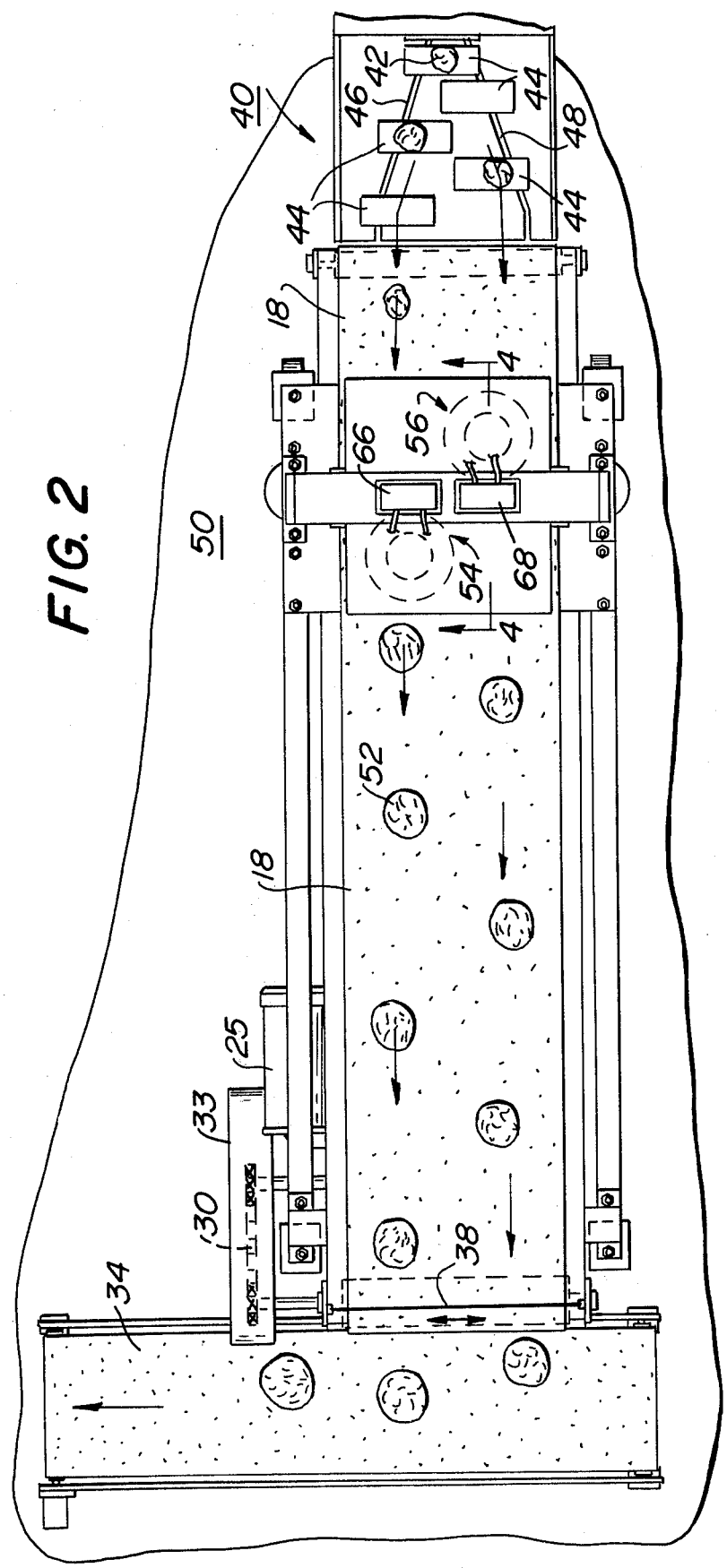
FIG. 2 is a plan view of the apparatus taken along line 2—2 in FIG. 1.

After the meat patties are formed, they pass over wire 38, which helps to loosen the patties from conveyor belt 18. Preferably, wire 38 is reciprocated back and forth as shown in FIG. 2 by any suitable means (not shown) such as by a reversing air cylinder or reciprocating motor. The wiggling or reciprocating of the wire 38 results in more efficient lossening of the patties from the conveyor and tends to keep the wire clean.

The patties drop down onto take-up conveyor 34 and are transferred to other locations for further processing, freezing or packaging. If desired, baffles (not shown) may be provided near the end of conveyor belt 18 to push the patties back into a single line for easier handling on conveyor 34.

In a typical application, 3 ounce substantially cylindrical masses of ground meat are deposited on the conveyor in two rows. These masses have a diameter of approximately 2 inches and a height of about 1½ inches and the cylinders stand on either flat end to prevent rolling on the conveyor. The flattening device is adjusted to provide patties having a thickness of approximately ⅜ inch and a diameter of approximately 3½ to 4 inches. The resulting meat patties have irregular edges and are plumper and juicier than those formed by presently available machines. Thus, according to the invention, the meat is not appreciably compressed, but rather simply flattened to the desired size and shape. If desired, the surface of the patties may be stippled to enhance the surface texture. This may be done by means of a suitably engraved stippling plate either at the same time as, or preferably in a separate operation after, the flattening of the meat cylinders into patties.

As compared to prior art methods and apparatus and the method and apparatus of our abandoned application Ser. No. 744,587, the present invention has a number of important advantages, including: greater and easier control of the size, shape and thickness of the meat patty; greater speed and efficiency are possible; meat temperature is less critical; the patty holds together better and maintains its size and shape better after cooking.

The present invention may be embodied in other specific forms without departing from the spirit or essential attributes thereof and, accordingly, reference should be made to the appended claims, rather than to the foregoing specification, as indicating the scope of the invention.

We claim:
1. An automated process for forming meat patties comprising the steps of:
   (a) forming a plurality of substantially cylindrical masses of ground meat, said masses being of substantially uniform weight;
   (b) distributing said masses of ground meat on a continuously moving conveyor surface; and
   (c) flattening said masses of ground meat between two moving surfaces, one of which is said continuously moving conveyor surface and the other of which is a substantially flat surface which reciprocates in a direction substantially perpendicular to the surface of said conveyor, to form substantially disk-shaped meat patties having irregular edges and a thickness from about ⅛ to about ½ of the length of said substantially cylindrical masses.

2. A process for forming meat patties according to claim 1 wherein the speed of said moving surfaces may be independently varied.

3. A process for forming meat patties according to claim 1 wherein the masses of ground meat are flattened without appreciable compression or densification of the meat.

4. A process for forming meat patties according to claim 1 wherein the thickness of said substantially disk-shaped patties is about 1/6 to about ⅜ of the length of said substantially cylindrical masses of ground meat.

5. A process for forming meat patties according to claim 1 wherein the meat used to make said patties is selected from the group consisting of beef, pork, lamb, poultry and fish.

6. A process for forming meat patties according to claim 1 wherein the distance traveled by said reciprocating flat surface is adjustable.

7. Apparatus for making meat patties comprising means for providing substantially cylindrical masses of ground meat in one or more rows on a first continuously moving driven conveyor, and at least one driven piston press disposed above said first conveyor to flatten said substantially cylindrical masses to form substantially disk-shaped patties having irregular edges, said piston press being reciprocatory in a direction substantially perpendicular to the surface of said first continuously moving conveyor.

8. Apparatus according to claim 7 wherein the meat flattening surface of said piston press has a coating of non-stick polymeric material.

9. Apparatus according to claim 8 wherein said non-stick polymeric material is selected from the group consisting of polytetrafluoroethylene and fluorinated ethylene-propylene copolymer.

10. Apparatus according to claim 7 including at least two reciprocating piston presses having alternating piston strokes which act on separate rows of ground meat masses.

11. Apparatus according to claim 7 further comprising a second take-off conveyor adjacent the exit end of said first conveyor, whereby said first conveyor may deposit said patties upon said take-off conveyor.

12. Apparatus according to claim 7 wherein the speed of said piston press is variable.

13. A process for forming meat patties according to claim 1 wherein at least one of said moving surfaces is heated to improve its non-stick characteristics.

* * * * *